Jan. 15, 1952  D. M. AUCHARD  2,582,405
STUD AND JOIST LAYOUT INSTRUMENT
Filed April 17, 1945
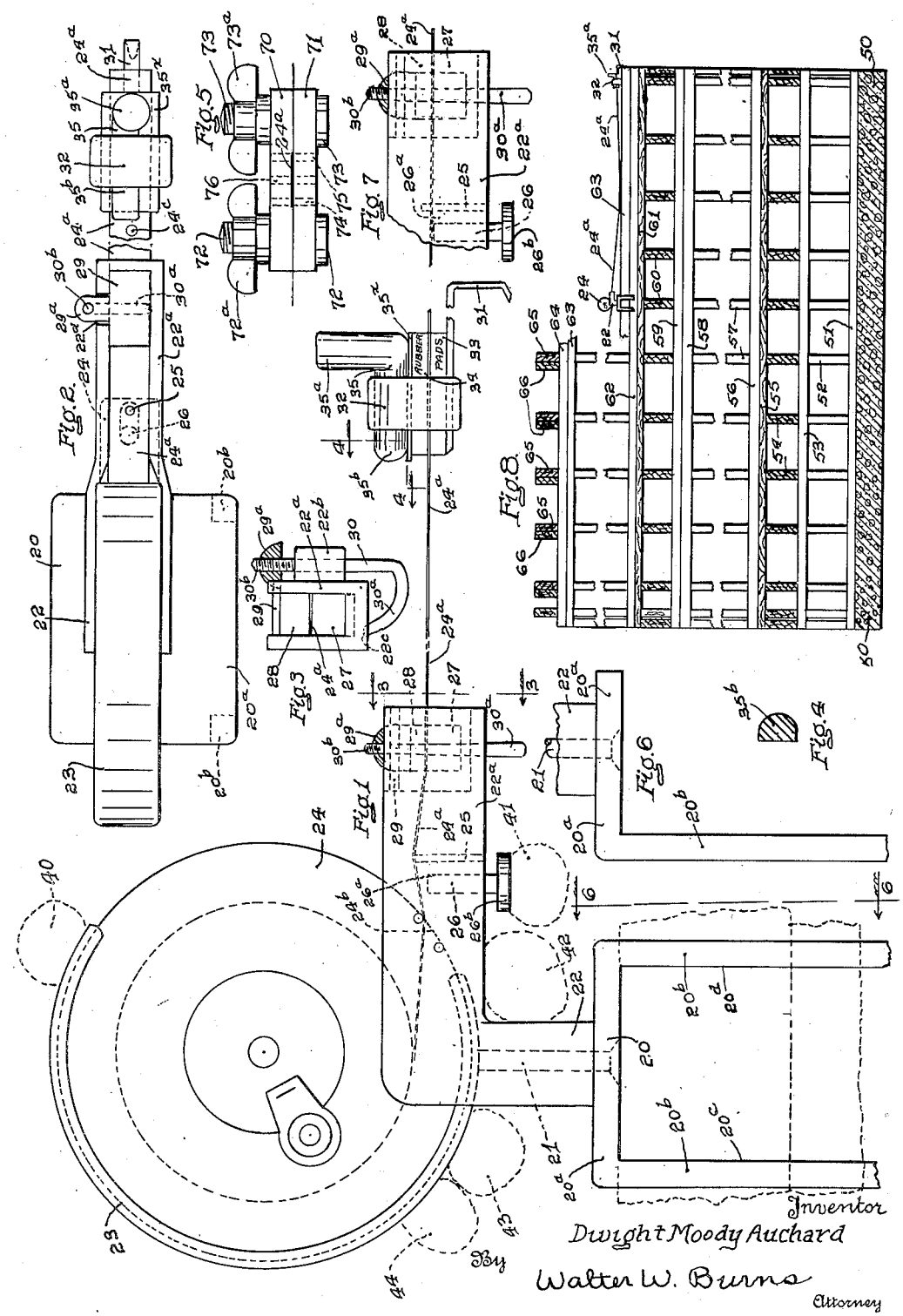
Inventor
Dwight Moody Auchard
By Walter W. Burns
Attorney Patented Jan. 15, 1952

2,582,405

UNITED STATES PATENT OFFICE 2,582,405

STUD AND JOIST LAYOUT INSTRUMENT

Dwight Moody Auchard, Vallejo, Calif.

Application April 17, 1945, Serial No. 588,823

7 Claims. (Cl. 33—138)

This invention relates to measuring devices and has particular relation to such a device as may assist, for example, in the laying out of joists and studs during building construction.

In a building of more than one story the joists and studs for the succeeding floors should be placed directly above the studs of the story below—not only in the exterior walls but in the interior walls as well.

A construction carried out in this manner will provide proper support of the various walls and floors and will eliminate settling of portions, thus preventing a cause of plaster and stucco cracking, floors creaking, doors and windows jamming. Such a construction also conforms to building ordinances in this respect.

In addition to the compliance with building regulations and the preventing of local settling, the accurate spacing of studs and joists obviously facilitates the work of plumbers and electricians and permits the use of wall board which requires accurate placing of the studs and ceiling joists.

In addition, the erection of the roof rafters is facilitated by the similar and accurate spacing of the ceiling joists and studs on opposite sides of a building since the accurate spacing of the parts of the construction below, permits the builder to precut the common and jack rafters with confidence and a definite knowledge of exactly where they will be nailed to the plates of the partition.

The proper and even spacing of studs and joists also results in a better job of bracing studs and cross-bridging joists as the bracing and bridging can usually be precut to lengths to fit between studs and joists which have been spaced apart a predetermined distance.

The usual tool for bringing about the proper and uniform spacing of studs and joists is a steel framing square or layout stick which is, in effect, three carpenter's squares fastened together. Obviously in measuring a comparatively long distance with such a measuring tool, which necessarily is comparatively short, the tool must be moved from one position to another to extend the line of studs or joists. This naturally introduces errors which may become cumulative as the tool is moved to new positions.

A further problem is the laying out of interior partitions which do not extend to the outer walls and where the rough sub-floor covers the joists so that the carpenter is not able to determine their exact positions while laying out the positions for the studs.

The primary object of the invention is the provision of an efficient device for use in aiding in the positioning of joists and studs during the construction of a building.

Another object of the invention is the provision of a compact layout instrument having a measuring tape and a line indicating means and space indicating means on the tape to determine the intervals between joists with relation to the line indicating means.

A further object of the invention is the provision of a layout instrument having a tape and tape holder, and anchor means for the type end with means for intermittently indicating the stud of joist spacing intervals with relation to a line indicating means.

Still another object of the invention is the provision of a layout instrument having a line indicating means, a tape and tape holder, an anchor means for the tape end, with means on the tape for interruptedly indicating the predetermined stud or joist spacing at the line indicating means.

A still further object of the invention is the provision of a layout instrument having a line indicating means, a perforated tape and tape holder, an anchor means for the tape end and means for engaging the perforations of the tape to indicate the predetermined stud or joint spacing at the line indicating means.

Other and further objects will be apparent to those skilled in the art from a reading of the complete specification.

Referring to the drawing wherein there is illustrated an embodiment of the invention, Fig. 1 is a side view of the instrument showing the positions of the fingers of the holding hand of the operative when the instrument is in use, some parts being broken away.

Fig. 2 is a top plan view of the instrument shown in Fig. 1.

Fig. 3 is a detail end view taken from the line 3—3 of Fig. 1.

Fig. 4 is detail view taken on the line 4—4 of Fig. 1.

Fig. 5 is a view of a clamping means used in punching clean perforations in the tape.

Fig. 6 is a fragmental view taken from the line 6—6 of Fig. 1.

Fig. 7 is a view similar to a portion of Fig. 1 but showing the detent in engagement with an opening in the tape.

Fig. 8 is a sectional view of a building construction showing how this invention is used.

Similar reference characters refer to the same or similar parts throughout the specification and drawing.

The numeral 20 designates the marking template upon which the other parts of my layout instrument are mounted. This template 20, as illustrated, has a top member 20a which has preferably two right angular extensions 20b which are used to locate the line for the placement of the studs and joists as will be later fully explained. Pivotally secured to the top member 20a by the pivot member 21 is the angular frame member 22. From the main body of the frame member 22 extends a right angular hollow portion 22a having an opening at the top to receive the spring clip 23 which is secured to the angular portion 22a in any suitable manner with its open end so placed as to facilitate the insertion and removal of the tape case 24. Within the case 24 is the tape 24a which will be later described. The tape case 24 may be removed and inserted in the clip 23, at will.

In use in the spring clip 23, the tape case 24 is so placed that the tape opening 24b through which the tape passes, will be in position to permit the tape to pass in position to be operated upon by the detent to be presently described.

In order to be able to withdraw the tape for a purpose to be described, and to have it at the correct place to indicate that a stud or joist mark should be made for designating the place for the positioning of the stud or joist, there is provided a detent and release device which will now be described. In this detent and release mechanism, one part is stationary and the other may be moved to effect the releasing function. As illustrated, the stationary member 25 is secured to the angular portion 22a and extends upwardly into the path of the tape 24a. In the form illustrated, the release plunger 26 of the detent and release mechanism 25—26 is in position to exert an upward pressure on the tape 24a at the will of the operative. A handle or finger member 26b is in position to be engaged by the index finger of the operative to cause an upward pressure of the portion 26a against the tape to cause the same to be lifted away from the detent 25. The tape 24a is provided with holes 24c in position to engage the end of the detent member 25 when the tape is not held in an upper position by the detent portion 26a. The holes 24c are spaced apart a distance equal to the space desired between the studs or joists to be placed.

Outward from the tape case 24 at a short distance beyond the detent 25 is a cleaning and oiling device which contacts both the upper and lower sides of the tape 24a. This device comprises a lower oiling and cleaning pad 27 and an upper oiling and cleaning pad 28 which latter is securely glued to the plate 29 for a purpose to be described. The plate 29 has at its side a rigid nut 29a which engages a screw 30. The screw 30 has a snug but slidable engagement with an opening or hole in a lug 22b on the side of the angular portion 22a of the frame 22. The lower or head end of the screw member 30 is provided with an arcuate extension 30a, the end of which engages a notch or depression 22c in the under surface of the angular portion 22a of the frame. The upper or threaded end 30b of the screw which is engaged by the nut portion 29a serves as an adjusting means for the pressure exerted by the upper surface of the oiling and cleaning pad 27 and the lower surface of the oiling and cleaning pad 28. It is believed to be obvious that the lower the position of the nut 29a on the threaded portion 30b of the screw 30, the tighter will be the pressure of the contact surfaces of the pads 27 and 28 with the surfaces of the tape 24a. As the pads 27 and 28 carry oil, it is clear that the surfaces of the tape will be kept in a clean and serviceable condition at all times. If it is found that the tape 24a is not held sufficiently tight by the pads 27 and 28, it is necessary only to turn the screw so as to disengage the end 30a from the depression or notch 22c and turn it counter-clockwise as viewed from the top, as many turns as necessary to produce the desired pressure of the pads 27 and 28 on the tape 24a, after which the end of the arcuate portion 30a of the screw 30 is against placed in the depression or notch 22c. Oil is added to the pads 27, 28 as necessity demands from its depletion caused by use. It is to be noted that there is provided a notch or cutaway place 22d in the side of the angular portion 22a as at 22c to provide for the up and down adjustment of the plate 29 and its nut portion 29a.

At the outer end of the tape 24a there is provided a hook means 31 for adjusting the relation of the outer opening 24c of the tape 24a to the outer edge of the building element used as a place of origin in the measurements which will determine the positions of the studs or joists to be placed. This hook 31 is provided with a means for gripping the tape 24a in a manner which will retain the tape 24a and the hook 31 in relatively adjusted position until it is desired to make another adjustment. An encircling frame 32 is of a size and shape to provide a surface for the hook at its lower inner circumference, above which are placed two compressing rubber pads 33 and 34, between which is the tape 24a. Above the compressing pad 34 is a plate 35x for contact with the lower surface of a handle 35 to be now described. When the handle 35 is in a position with the angular portion 35a extending upwardly, the eccentric portion 35b will be with its long dimension in a position to press the compressing rubber pads together and to grip the tape 24a which is located therebetween. When the angular portion 35a is turned 90° from a vertical position, the compression of the compressing pads 33 and 34 is released and the tape 24a may be moved relative to the hook 31. In this manner, the point of the hook 31 can be placed and maintained in any desired position longitudinally, relative to the first or outer hole 24c in the tape 24a. When the desired relation is obtained, the angular portion 35a is again turned to bring the long dimension of the eccentric portion 35d in a position to compress the compressing pads 33 and 34 against the tape 24a to hold the latter in adjusted relation to the hook 31.

In Fig. 1 the fingers of the operative are indicated as disposed when the instrument is being used. The thumb is at the top of the spring clip 23 as at 40, the index finger being in a position, as at 41, to operate the release plunger 26. The middle finger is placed in the angle of the angular portion 22a as at 42. The ring and small fingers are at the rear as at 43 and 44 in Fig. 1. The relative positions are the same regardless of the use of the right or left hand to hold the instrument, the free hand being used to mark with a pencil, the place where the stud or joist is to be placed. The edge used for this purpose will, of course, depend upon the calibration of the tape by the adjustment of the hook and tape end, as has been described. As an example, the two inside edges 20c and 20d of the depending portions 20b can be used. If the distance between these two edges is the thickness of the stud or joist, then both edges become the outer boundaries of the position of the stud or joist to be placed. And if the pencil is used to mark these positions, it is obvious that the positions to be occupied by the studs or joists will be clear after the instrument has been removed.

In operation, after the hook has been adjusted on the end of the tape, the instrument is grasped with one hand, the operative having a pencil in the other. With the hook over the side of the building element from which the measurements are to be made, the operative draws the instrument toward the direction of the line along which the measurements are to be made. When the first hole 24c of the tape 24a comes over the detent 25, the latter enters the hole 24c and the outward movement of the tape 24a is arrested.

The operative now places the instrument over the plate or plates on which the line is to be drawn, as shown in Fig. 1 and the lines drawn on the insides of the extensions 20b as already described. The operative then presses with the index finger on the release plunger 26. This action lifts the tape 24a clear of the detent 25 with the result that the tape is free to be withdrawn from its case 24. The operative now releases the pressure of his finger and pulls the instrument along to the next place where the point of placing the stud or joist is indicated by the detent 25 entering the next hole 24c in the tape 24a. The operative then marks the position of the next stud or joist and the operation is continued across the building until all of the positions of the studs or joists are located.

The application of the invention and its use in a building being constructed will now be described in connection with the parts of a building construction which are well known in the art and are not a part of the present invention.

In Fig. 8 such a construction is illustrated with the invention illustrated in use. At the bottom of Fig. 8 is shown the concrete foundation 50. Above this foundation is the sill 51. On the top of the sill is placed the underpinning 52 upon which is placed the top plate 53. The joists 54 are secured to the top plate 53 and the subfloor 55 is nailed to the joists 54. A bottom plate 56 is placed on and secured to the subfloor which is followed by the studs 57, the top plate 58 and a second top plate 59.

The second floor joists 60 are secured to the second top plate 59, which is followed by a subfloor 61 and a second floor bottom plate 62. It is assumed that the present invention has been used up to this point in the construction, as already described and which will again be described as applied to the construction at this point in the building operation. The piece of lumber which is to become the top plate 63, is placed on the top of the second floor bottom plate 62, care being taken to see that the end from which the measurements are to be taken is exactly over the corresponding end of the second floor bottom plate 62.

The instrument is now taken in one hand and the hook 31 is placed over the end of the piece of lumber which is to become the second floor top plate 63. The instrument is now drawn to the left as illustrated until the detent 25 enters the first hole 24c of the tape 24a. The instrument is now placed on the same piece of lumber which is to become the second floor top plate 63 with the extensions 20b in position so that marks may be placed on the inside edges of the extensions 20b to indicate the future position of the first stud with relation to the bottom plate 62 and the top plate 63. The indicating marks are now drawn. The index finger 41 now releases the tape 24a from the detent 25 by pressing upwardly on the releasing plunger 26. The instrument is now drawn along the piece which is to become the second floor top plate 63 until the detent 25 again stops the movement of the instrument. In the same manner, the marks indicating the positions of the studs where they contact the bottom plate 62 and the piece to become the top plate 63, are applied.

After the placing and securing of the top plate 63, the second top plate 64 is similarly marked and secured in place. The same method of marking may be followed to determine the positions of the ceiling joists 65. The ceiling joists 65 are now applied and secured in place. The rafters 66 may now be placed alongside the ceiling joists 65. By this instrument and its use as described, the builder is assured that each stud above will be exactly above those which are below, with the resultant advantages which have already been pointed out as the objects sought by the present invention.

Where interference with portions of the building already erected, is encountered, it may be necessary to alter the adjustment of the hook 31 relative to the first hole 24c of the tape 24a.

By the use of this instrument, not only is great accuracy obtained but much time is saved due to the rapidity with which the places of location of the studs, are obtained.

An aid to the operative in punching clean stop openings in the tape 24a is illustrated in Fig. 5.

Here, the two steel plates or clamping members 70, 71 are similarly shaped with suitable outer openings to receive the clamping screws 72, 73 with their wing nuts 72a, 73a. Suitable guiding or registration pins 74, 75 are provided on each side of the opening 76, which opening extends through both plates or clamping members 70, 71. When the tape 24a is in position to have a hole punched and the wing nuts 72a, 73a are tight, a suitable punching tool is inserted in the opening 76 and forced through to form the stop hole 24c in the tape 24a.

It will thus be clear that with a tape having the openings 24c, to act as stops for the detent 25, properly set with relation to the hook 31 and the tape 24a the carpenter using this invention can lay out work very accurately and several times as fast as with the previously used equipment. And since speed is a very important element—not only in saving the worker's time but in finishing a contract on time—this invention performs a very important function in building operations.

Moreover its construction produces work with evenly spaced studs and joists which result in a better and stronger job of bracing studs and cross-bridging joists since the bracing and bridging is usually precut and of a length to fit between studs and joists placed at certain predetermined distances apart.

An advantage in the present invention appears when installing extra joists for supporting interior walls. In this case the present practice is to locate them parallel to an interior wall by the use of a tape. Since with the use of this invention, the partition supporting joists can be placed parallel to the nearest joist, it is possible to avoid taking time to measure from an exterior wall of the building.

Further it will be apparent that the use of this instrument is much less tiring than other methods since the operative proceeding at a walk, is constantly moving and saves much time in bent position over the floor. In fact, its operation is so simple and definite that the operative is able to use it effectively and accurately in dim light or even with his eyes closed.

While I have illustrated and described in detail one form of my invention, I desire to have it understood that the disclosure is merely illustrative and that modifications and changes may be made without departing from the spirit of the invention and within its scope as claimed.

Having thus described my invention, what I claim as new and desire to secure by Letters Patent, is;

1. A stud-joist layout instrument, comprising in combination a frame, a take-up reel mounted on said frame, an elongated flexible tape member having one end attached to said reel and windable thereon; a detent on said frame adapted to engage spaced holes in said elongated flexible tape member, whereby said frame may be fixed in any one of a plurality of known positions along said tape member; means to disengage said detent from the aforementioned holes, a template on said frame, said template adapted to slidably engage a plate or sill to be marked for studs or joists.

2. A stud-joist layout instrument, comprising in combination, a frame, means for attaching a tape case to said frame; said tape case containing a take-up reel and an elongated flexible tape member having one end attached to said reel and windable thereon; a detent on said frame adapted to engage spaced holes in said elongated flexible tape member, whereby said frame may be fixed in any one of a plurality of known positions along said tape member; means for disengaging said detent from the aforementioned holes, a template on said frame, said template adapted to slidably engage a plate or sill to be marked for studs or joists.

3. A stud and joist layout instrument comprising a frame, a reel mounted on said frame, an elongated flexible tape member having one end attached to the reel and windable thereon, a template secured on the frame, the template having laying out edges to fit two sides of a piece of lumber, at 90° from each other along which the positions of the studs and joists may be marked and coacting stop means between the frame and tape for fixing the lineal relation between the tape and frame at predetermined intervals.

4. The combination specified in claim 3 with the addition thereto of a pivoted connection having its axis substantially at 90° to the line of the tape between the template and the frame.

5. A stud and joist layout instrument comprising a frame, a take-up reel mounted on said frame, an elongated flexible tape member having an end connected to the reel and having spaced stud-position indicating stop means thereon, a detent on the frame in position to engage the spaced stop means of the tape successively, the frame having portions for engagement with a stud or joist to determine the position of the frame with the plane of one surface of the stud or joist as the frame of the instrument is moved therealong.

6. The combination specified in claim 5 with the addition thereto of means for disengaging the tape and detent from each other.

7. A stud and joist layout instrument comprising, in combination, a frame, a take-up reel mounted in the frame, an elongated tape member having holes spaced therealong and having one end attached to the reel and windable thereon, a detent on said frame adapted to engage said spaced holes in the flexible tape member whereby said frame may be fixed in any one of a plurality of predetermined positions along said tape member, means to disengage said detent and holes, a template on said frame, said template being adapted to slidably engage a plate or sill to be marked for placing studs or joists and a pivot means between the template and frame, the pivot axis being substantially perpendicular to the line of the tape.

DWIGHT MOODY AUCHARD.

REFERENCES CITED

The following references are of record in the file of this patent:

UNITED STATES PATENTS

| Number | Name | Date |
| --- | --- | --- |
| 652,814 | Setzer | July 3, 1900 |
| 838,463 | Saxon | Dec. 11, 1906 |
| 1,106,152 | McIntosh et al. | Aug. 4, 1914 |
| 1,148,306 | Fritz | July 27, 1915 |
| 1,599,827 | Lindemeyer | Sept. 14, 1926 |
| 1,679,178 | Shillman | July 31, 1928 |
| 1,790,103 | La Follette | Jan. 27, 1931 |
| 1,906,456 | Farrand | May 2, 1933 |
| 1,987,264 | McMahan | Jan. 8, 1935 |